United States Patent
Spellman

(10) Patent No.: US 8,256,808 B2
(45) Date of Patent: *Sep. 4, 2012

(54) TONGS WITH BASTING APPARATUS

(76) Inventor: Edward F Spellman, Lakewood, OH (US)

( * ) Notice: Subject to any disclaimer, the term of this patent is extended or adjusted under 35 U.S.C. 154(b) by 353 days.

This patent is subject to a terminal disclaimer.

(21) Appl. No.: 12/131,914

(22) Filed: Jun. 2, 2008

(65) Prior Publication Data

US 2009/0140535 A1    Jun. 4, 2009

Related U.S. Application Data

(60) Provisional application No. 60/932,818, filed on Jun. 2, 2007, provisional application No. 60/993,454, filed on Sep. 12, 2007.

(51) Int. Cl.
*A47G 21/00*    (2006.01)
*B25B 7/00*    (2006.01)

(52) U.S. Cl. ............. 294/3; 294/16; 294/99.2; 269/3; 269/95; 7/110; 7/111; 7/112; 7/113; 15/236.06

(58) Field of Classification Search ............. 294/3, 16, 294/99.2; 15/105, 106, 236.06, 236.07; 269/3, 269/6, 95; 7/110–113, 122; 220/754, 756, 220/735; 99/345, 346, 347
See application file for complete search history.

(56) References Cited

U.S. PATENT DOCUMENTS

| | | | |
|---|---|---|---|
| 2,368,297 A * | 1/1945 | Hanke | 220/759 |
| 2,635,611 A * | 4/1953 | Marcellus | 132/217 |
| 2,834,037 A | 5/1958 | Schumann | |
| 3,032,177 A | 5/1962 | Majors | |
| 3,897,722 A | 8/1975 | Harris | |
| 4,577,900 A * | 3/1986 | Chasen | 294/118 |
| 4,955,971 A | 9/1990 | Goulter | |
| 5,199,756 A | 4/1993 | Bartlett et al. | |
| D351,534 S | 10/1994 | Weber | |
| 5,601,322 A * | 2/1997 | Forest | 294/3 |
| 5,934,721 A | 8/1999 | Walde | |
| 5,941,411 A * | 8/1999 | Langenbach | 220/735 |
| 6,056,338 A | 5/2000 | Kerr | |
| 6,089,631 A | 7/2000 | Thurlow et al. | |
| 6,250,312 B1 * | 6/2001 | Dasilva | 132/208 |
| 6,485,691 B1 * | 11/2002 | Jones | 422/102 |
| 6,682,112 B2 | 1/2004 | Neal et al. | |
| D488,032 S | 4/2004 | Best et al. | |
| D502,367 S | 3/2005 | Claypool et al. | |
| 6,910,241 B2 | 6/2005 | Wang | |

(Continued)

FOREIGN PATENT DOCUMENTS

NZ    513870    9/2001

*Primary Examiner* — Dean Kramer
*Assistant Examiner* — Stephen Vu
(74) *Attorney, Agent, or Firm* — D.A. Stauffer Patent Services LLC

(57) ABSTRACT

A pair of tongs in combination with a basting apparatus and an optional sharpened edge that can be used as a knife for cutting into food to check for degree of cooking. Also a container for use as a holder of a tool, such as a pair of tongs with a basting apparatus, for applying a spreadable basting material (e.g., sauce) held in the container. The container provides a stable support of the tool, such as the pair of tongs, to prevent cross contamination of working surfaces and basting material on the basting apparatus, while at the same time providing a holder from which the tongs/baster efficiently can be retrieved for use.

19 Claims, 6 Drawing Sheets

U.S. PATENT DOCUMENTS

| | | |
|---|---|---|
| 7,008,077 B2 | 3/2006 | Raichlen |
| 7,249,793 B1 | 7/2007 | Jabr |
| 7,316,434 B1 | 1/2008 | Kerr |
| 2001/0045753 A1 | 11/2001 | Lewis |
| 2004/0026939 A1* | 2/2004 | Jordan et al. ............... 294/3 |
| 2005/0138736 A1* | 6/2005 | Tarlow ............... 7/110 |
| 2006/0225725 A1 | 10/2006 | Rinaldo |
| 2007/0006411 A1 | 1/2007 | Foster et al. |
| 2007/0050986 A1 | 3/2007 | Foster et al. |
| 2008/0054661 A1 | 3/2008 | Schneider |

* cited by examiner

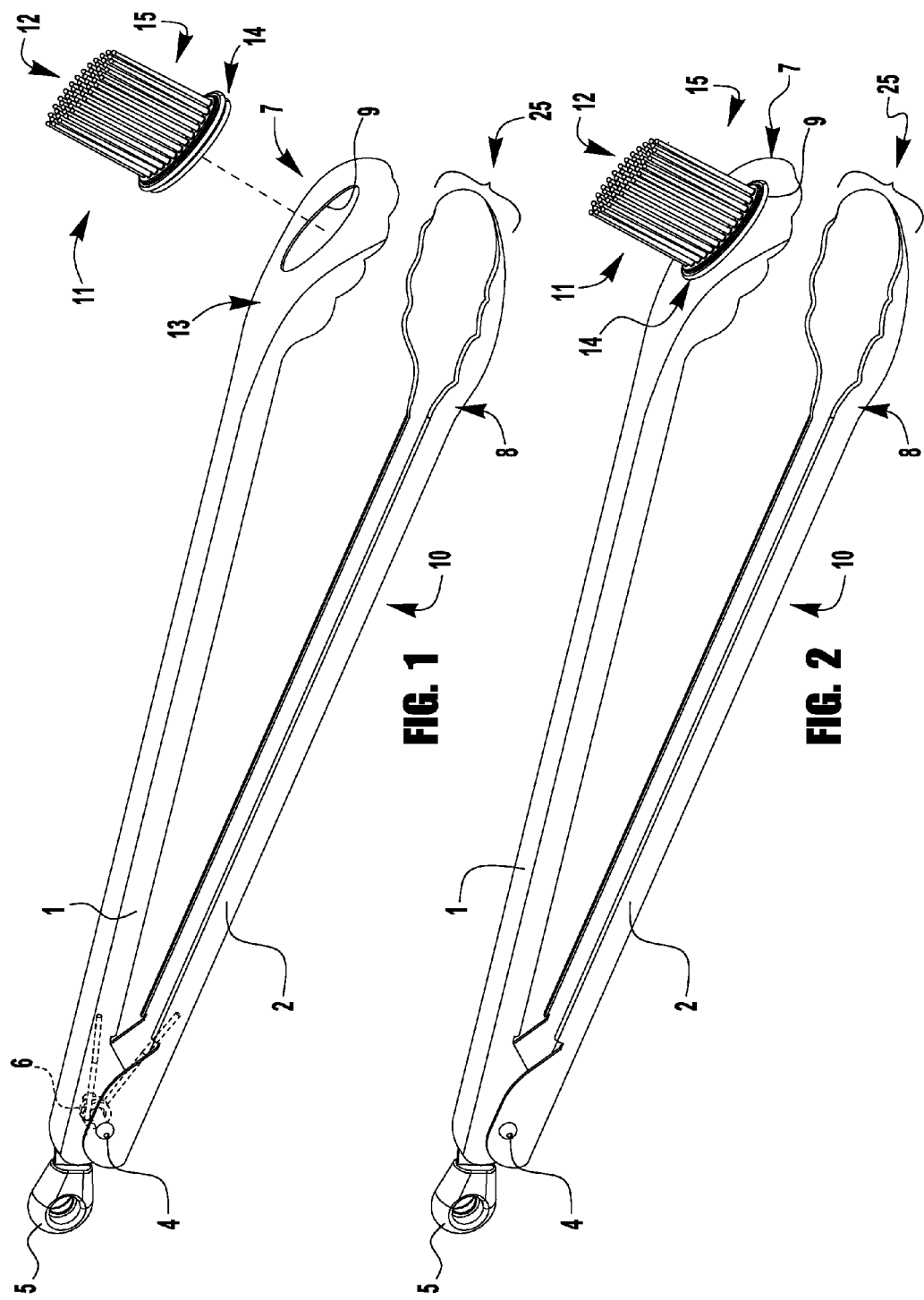

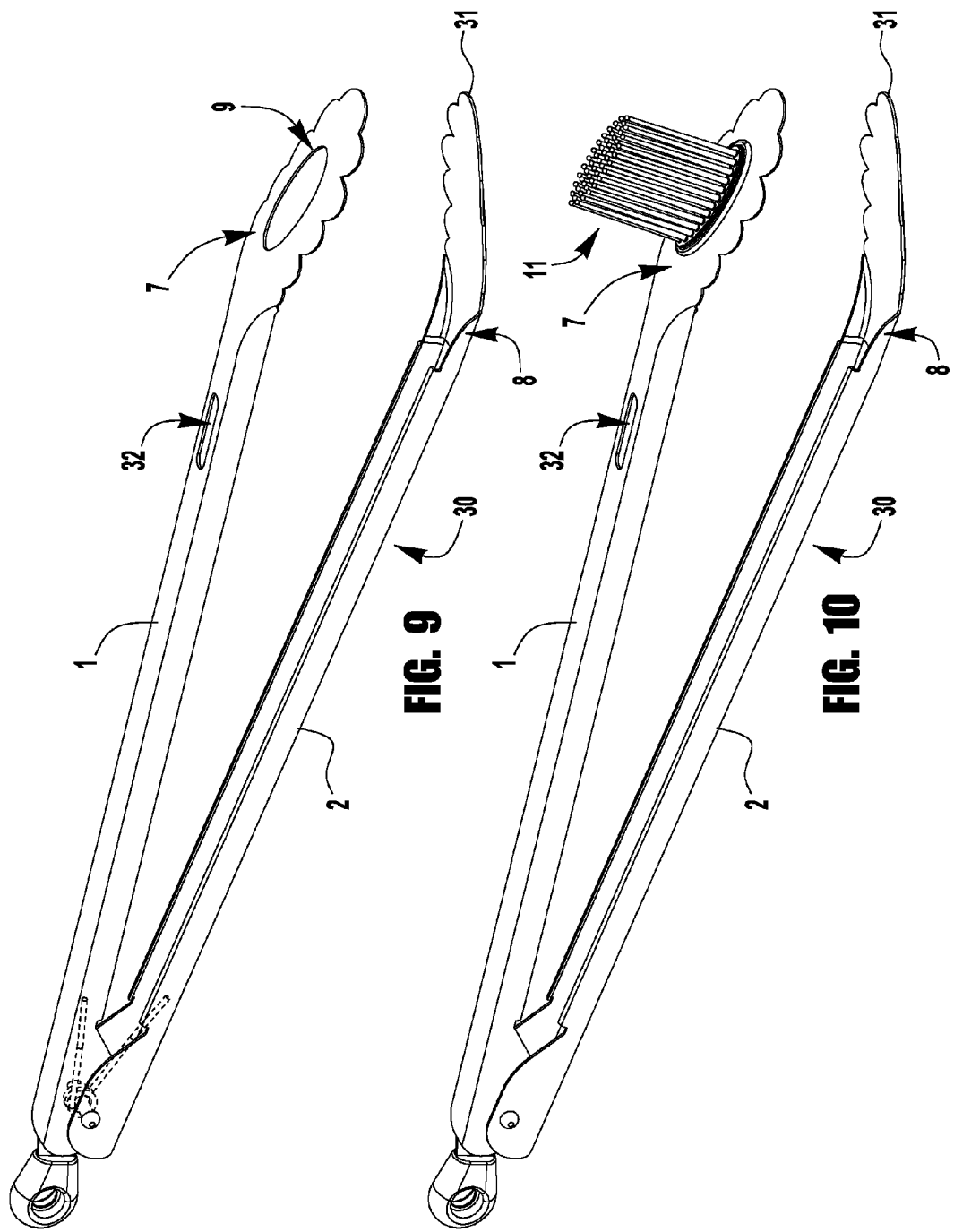

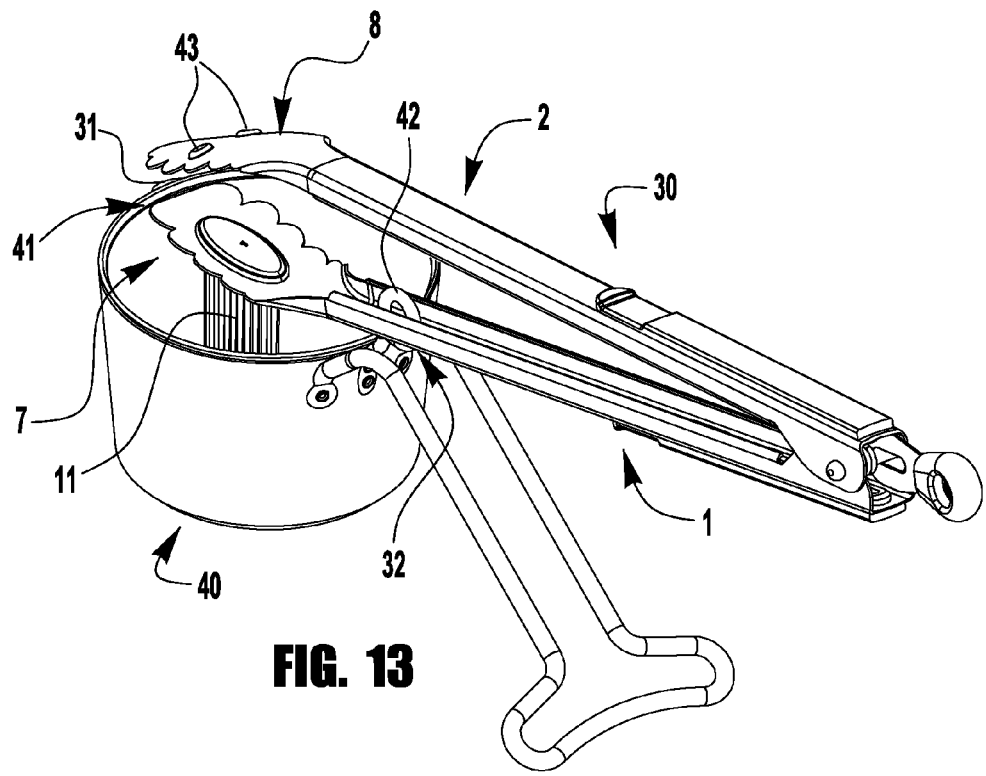
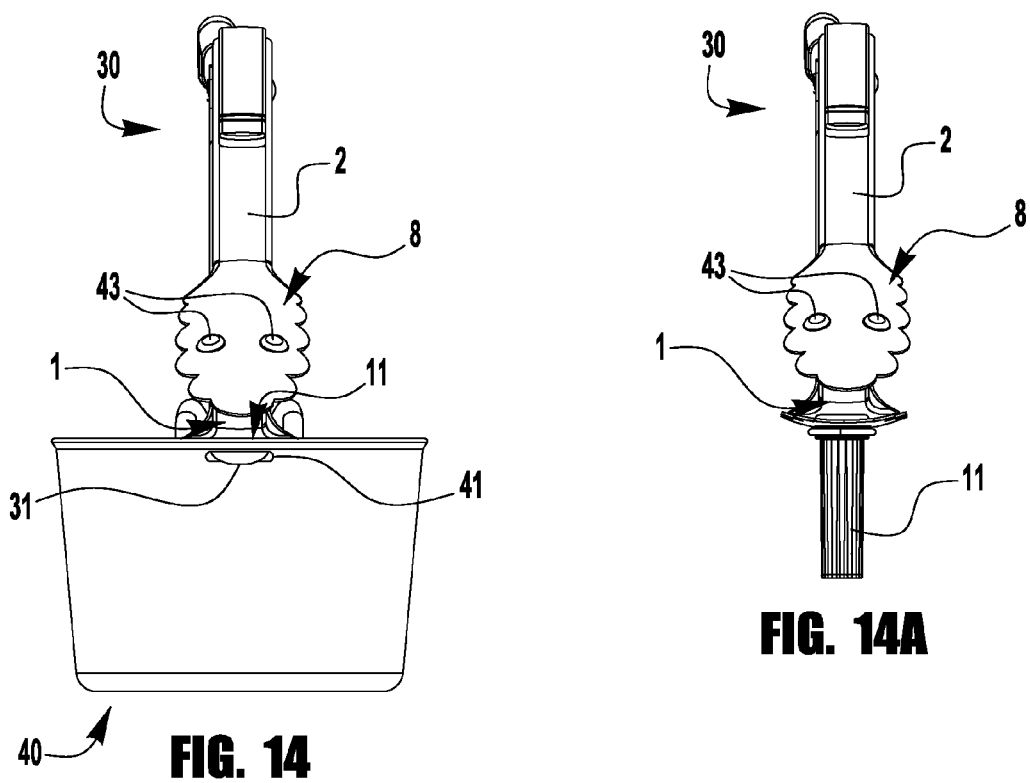

TONGS WITH BASTING APPARATUS

CROSS-REFERENCE TO RELATED APPLICATIONS

This application claims the benefit of U.S. Provisional Patent Application Nos. 60/932,818 (filed Jun. 2, 2007), and 60/993,454 (filed Sep. 12, 2007), both by Edward F. Spellman.

BACKGROUND OF THE INVENTION

Tongs are a utensil often used in food preparation and/or serving to handle hot food items, especially during or after grilling or barbecuing, baking, frying, and the like. Often a utensil, such as a basting brush, is also used especially during barbecuing of meats or other items, or for coating and/or glazing of baked goods, such as rolls, muffins, pastries, and the like, or of fried goods, such as donuts, egg rolls, shrimp, chicken, and the like. Other utensils commonly used during food preparation can include knife-edged utensils for cutting into an item during cooking to determine if it is cooked to a desired degree.

Often, such cooking, coating and/or glazing, includes handling the food items at high temperatures and/or over open flames, and it is generally desirable to have the required utensils nearby for convenient and safe use. It is also desirable to minimize cost, storage space, and inconvenience associated with cleaning the utensils and cooking area, without compromising safety. For example, while grilling, the working ends of the utensils used to manipulate or coat the food items can get contaminated with grease, sauce and/or marinade. A common method used to prevent this contamination from being transferred to a surface used to support the utensils when not in use, such as a nearby table or a work platform that is part of a grill, or the like, is to let the contaminated end of the utensil hang down from or over the side of the support surface. This is an undesirable solution in that it can open the possibility that the person doing the grilling, or someone else, could inadvertently brush up against the contaminated utensil and stain their clothing, or an animal such as a family pet may wander by and lick the juices from the utensil, thereby contaminating the utensil.

Therefore, there is a need for utensils or a combination of utensils that efficiently reduce or eliminate the problems associated with cooking and/or barbecuing or grilling food items, and provides a safer and more effective way to prepare hot food items.

SUMMARY OF THE INVENTION

According to the invention, a pair of tongs is combined with a basting apparatus and an optional sharpened edge that can be used as a knife for cutting into food to check for degree of cooking. As used herein, the term "basting apparatus" is defined as a device for applying a spreadable material ("basting material") to any article, and the article is not limited to food products and the like. The invention further comprises an open top container for use as a holder of a tool (utensil) that includes a basting apparatus for applying a basting material that is held in the container. The spreadable basting material can be liquid, semi-liquid, paste-like, powdered and the like without limitation.

Although the invention is described herein in reference to barbecuing or grilling, other uses for the tools and container (accessories) are also envisioned. As a non-limiting example, the inventive accessories can be used for other forms of food preparation, including handling and spreadably coating baked goods or fried foods, and the like. The accessories can also be used to handle and clean or coat hot, toxic, and/or high purity non-food items such as, but not limited to, computer chips, mirrors, lenses, biological samples, and the like, without limitation.

Thus the invention provides a pair of tongs that can be used as a two-in-one combination of utensils (the pair of tongs and a basting apparatus) and, optionally, a three-in-one combination of utensils when the knife edge is included. For example, a long handled utensil that incorporates the functionality of tongs, a basting brush or the like, and an optional knife could be the only utensil needed to safely (cleanly) and efficiently barbecue many favorite foods.

The inventive basting material container is intended for use as a holder of a tool such as, but not limited to, a cooking utensil such as a pair of tongs or the like, and/or a combination of tongs with basting apparatus and optional sharpened edge. As described above, the container can also be used as a holder of a tool that is used to handle and clean or coat non-food items, without limitation. Thus the container can also be a combination of two utensils, for example: a container for a "basting material" product such as, but not limited to, a marinade, barbecue sauce, cleaning solution, and the like; in addition to supporting a tool. Moreover, stable support of the tool on the container can prevent cross contamination of working surfaces and materials on the tool by providing a container that supports, for example, a tool such as a pair of tongs in such a manner that the contaminated tong ends and/or the basting apparatus are placed over the open top of the container, while at the same time providing a surface from which the tongs efficiently can be retrieved for use. Thus working surfaces are not contaminated by materials (e.g., basting material, food juices) that are on the tool, and the tool is not contaminated by objects, people, pets, etc. that could contact the tool's surfaces and/or materials thereupon.

In particular, the invention provides a pair of tongs comprising (a) a first tong arm and a second tong arm connected to each other in a manner such that the first and second tong arms can move toward and away from each other, the first and second tong arms having a first front end and a second front end, respectively, designed for grasping articles; (b) a first seating portion in the first front end suitable for mounting of a basting apparatus, wherein the first seating portion is optionally an opening through the first front end; (c) an optional basting apparatus comprising a second seating portion mounted to the first seating portion of the first front end, wherein the basting apparatus comprises a basting surface extending outwardly from the first seating portion; (d) an optional nose portion of the first front end having a size and shape suitable for removable containment of the nose portion in a nose seating area of a distal portion of a side of an open container; and (e) an optional opening in the first tong arm of a suitable size and shape for removably engaging an alignment tab associated with a proximal portion of an open container, wherein the pair of tongs can be supported by the open container by means of engagement of the nose portion of the first front end in the nose seating area of the distal portion of the side of the container and the engagement of the opening in the first tong arm with the proximal alignment tab of the open container.

The invention further provides the container for use as a holder of a tool for applying a basting material held in the container, the container comprising a structure for accommodating a tool, such as a pair of tongs, that comprises a basting apparatus having an exterior basting surface, a nose portion in a first front end, and a first tong arm comprising an opening, wherein the pair of tongs can be supported substantially stably by the container by means of engagement of the nose portion of the first front end in the distal nose seating area of the container and the engagement of the opening in the first tong arm with the proximal alignment tab of the container. The tong accommodation structure of the container optimally further comprises positioning the basting surface above the open top of the container such that excess basting material on the basting surface is containable by the open top portion of the container. In a simplified embodiment, the tong arm opening and the alignment tab may be omitted, thereby still enabling support of the tool, but perhaps not necessarily holding it in place on the container.

The invention further provides a convenient mechanism for stably supporting and removably holding the tool on the container that both guides the tool into the proper place on the container, and also secures the tool in place on the container. For example, the opening in the first tong arm can be spaced apart from the nose portion such that the nose must be fully engaged in the nose seating area before the opening in the first tong arm can be fully engaged with the alignment tab. Then the tool can only be separated from the container by first lifting the first tong arm from the alignment tab of the container, and then sliding the tongs outward along the container handle to disengage the nose portion from the container.

The inventive container has features that are uniquely suited to solve the problem of stabilizing a pot against tipping over while supportively holding a relatively long handled tool above it such that one end of the tool is held above an open top of the container. Thus important aspects of the present invention(s) lie in the novel combination of container and mating tool features, which then enable conventional stabilizing/anti-tip engineering design rules to be applied to determine suitable dimensions, weights, and material characteristics for the inventive features.

Other objects, features and advantages of the invention will become apparent in light of the following description.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

The structure, operation, and advantages of the present preferred embodiment of the invention will become further apparent upon consideration of the following description taken in conjunction with the accompanying drawings, wherein:

FIG. 1 is a partially exploded isometric view of a pair of tongs that shows a tong arm having a cutout portion for mounting of a brush type of basting apparatus, an arm with a knife or sharpened edge, and a conventional locking mechanism.

FIG. 2 is an isometric view of the tongs of FIG. 1 with the basting brush mounted in the cutout portion of the tong arm.

Figure 3:
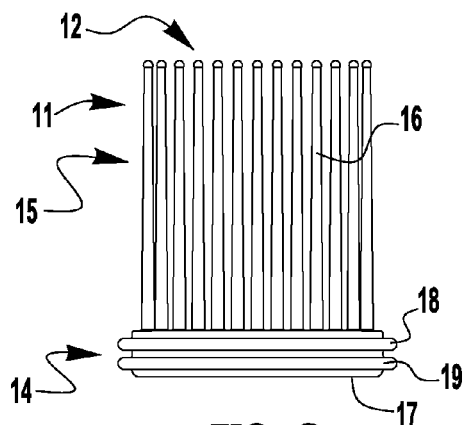

FIG. 3 is a side view of a brush type of basting apparatus that has bristles, a central stem and two retention flanges.

Figure 4:
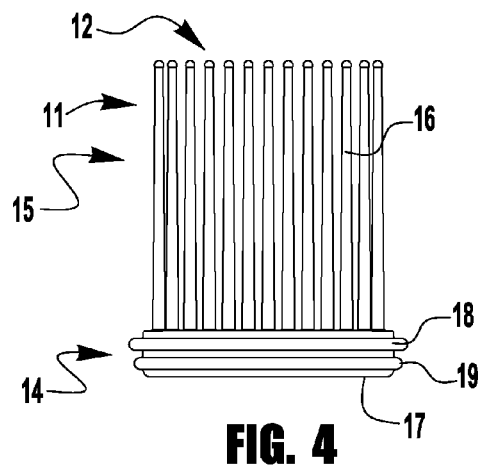

FIG. 4 is a side view similar to FIG. 3, but showing an upper retention flange that has a greater width than a lower retention flange.

Figure 5:
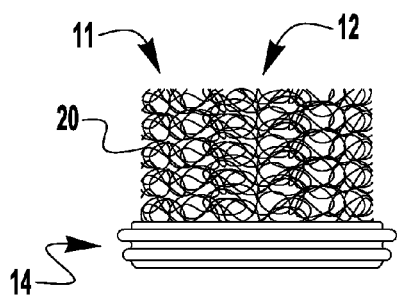

FIG. 5 is a side view of an alternate basting apparatus that employs a basting pad in place of a bristle brush.

Figure 6:
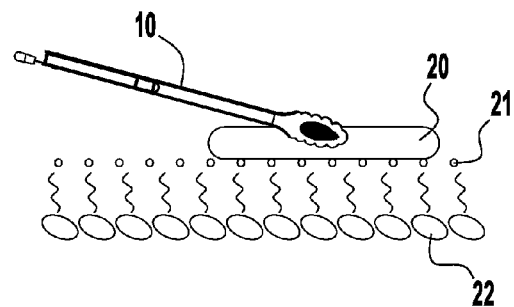

FIG. 6 is a side view of a pair of tongs, with or without a basting apparatus, being used to turn a hotdog that is cooking on a grate suspended above a bed of hot coals.

Figure 7:
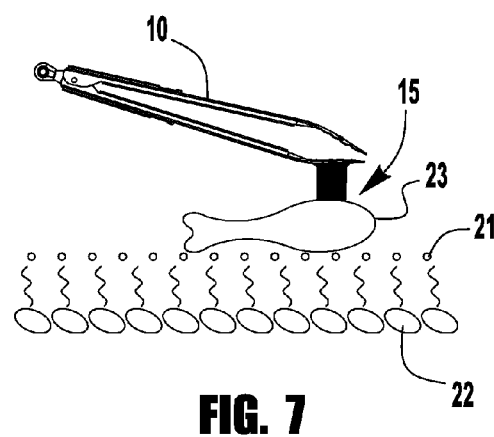

FIG. 7 is a side view of a pair of tongs with a basting apparatus being used to baste a chicken leg.

Figure 8:
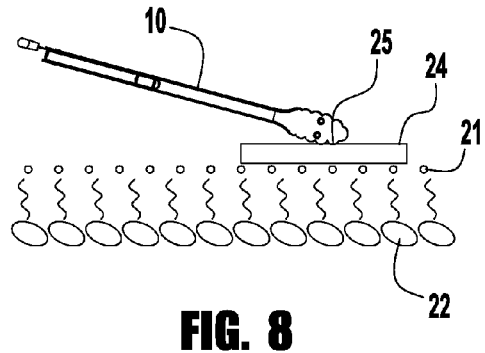

FIG. 8 is a side view of a pair of tongs, with or without a basting apparatus, being used as a knife to check whether a pork chop is fully cooked.

FIG. 9 is an isometric view of a pair of tongs that shows a nose portion for removable mounting in a nose seating area of a tool-holding container, and an optional opening in a tong arm for removably engaging an alignment tab on the tool holding container.

FIG. 10 is an isometric view of the pair of tongs of FIG. 9, also including a seated basting apparatus.

Figure 11:
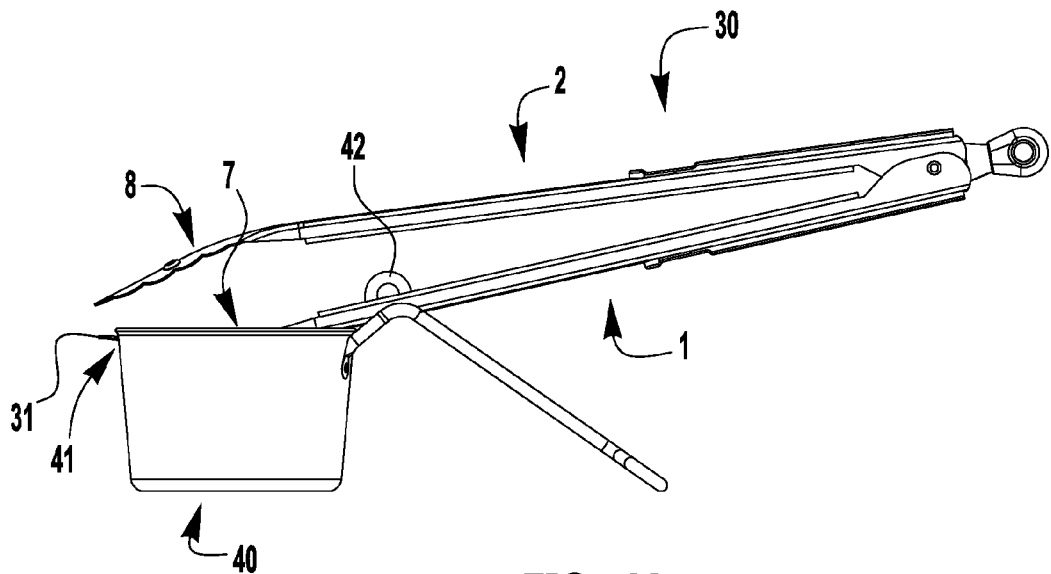

FIG. 11 is a side view of a pair of tongs being supported by a tool holding container, including seating of the tong nose portion in the nose seating area, and engagement of the tong arm opening with the container's alignment tab.

Figure 12:
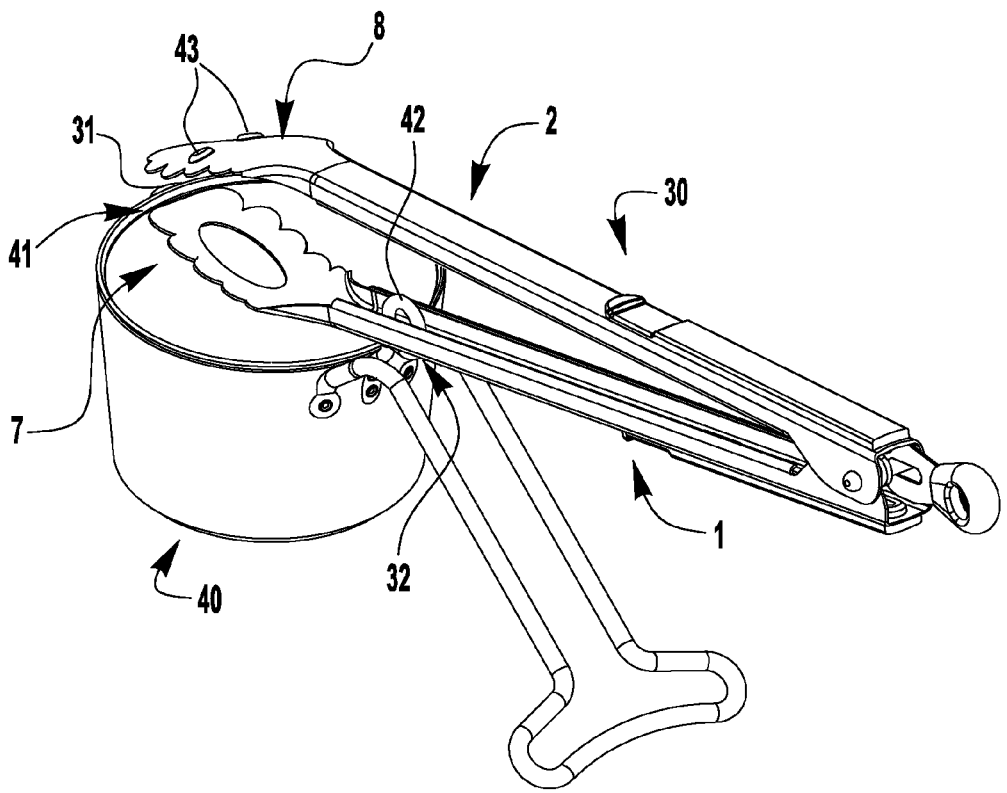

FIG. 12 is an isometric view of a pair of tongs being supported by the tool holding container.

FIG. 13 is an isometric view of a pair of tongs, including a basting apparatus, supported by the container, wherein the basting apparatus extends exteriorly from the tongs and is directly over an open top of the container.

FIG. 14 is a front view of the pair of tongs supported by the container and illustrates decorative features.

FIG. 14A is a front view of the pair of tongs with basting apparatus and illustrates decorative features thereof.

Figure 15:
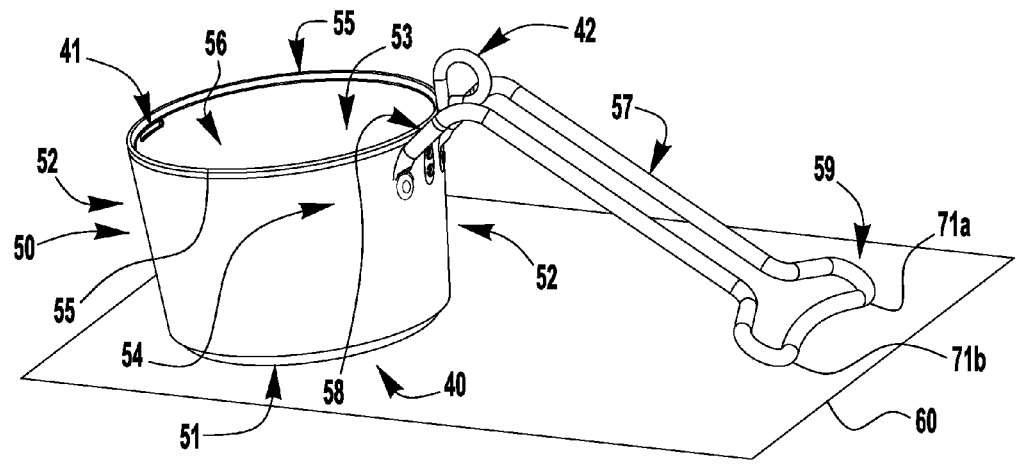

FIG. 15 is an isometric view of the tool holding container that illustrates an open pot having an ergonomic anti-tipping handle, an alignment tab, and a nose seating area for a tool, such as a pair of tongs, or the like.

Figure 16:
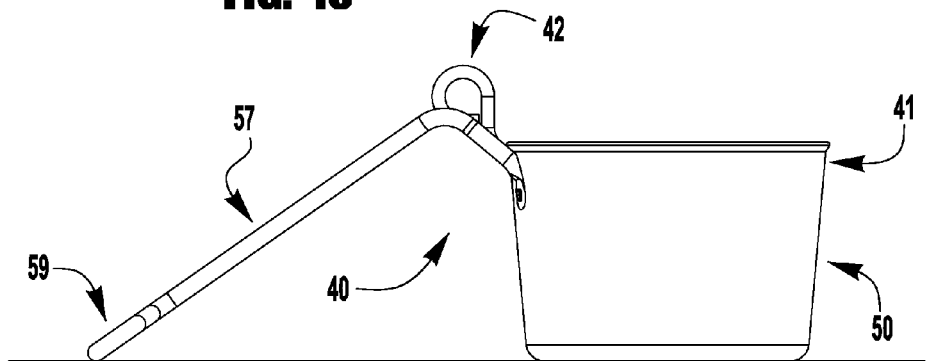

FIG. 16 is a side view of the container of FIG. 15.

Figure 17:
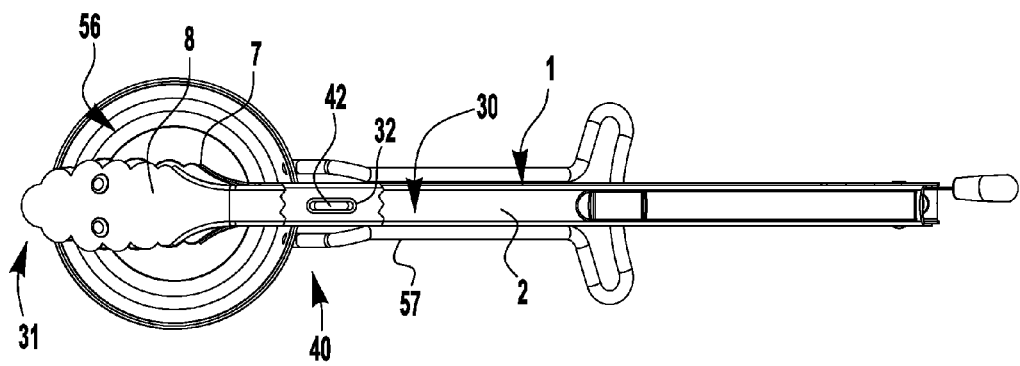

FIG. 17 is a top view of the container of FIGS. 15 and 16 shown stably supporting a long-armed pair of tongs, wherein a portion of a top tong arm is cut away to reveal an opening in a bottom tong arm that is removably engaged with the alignment tab on the container.

DETAILED DESCRIPTION OF THE INVENTION

In one arrangement illustrated in FIG. 1, the invention is directed toward a pair of tongs 10 having a first tong arm 1 and a second tong arm 2 connected to each other in a manner such that the first and second tong arms can move toward and away from each other. In this aspect, the pair of tongs 10 is considered to be a conventional pair of tongs. As a non-limiting example, the tongs 10 illustrated in FIG. 1 have a separate first tong arm 1 and second tong arm 2 that are joined at a hinge pin 4, and further have a locking mechanism 5, and a torsion spring 6. However, tongs having any type of conventional locking system are suitable for the invention. Many other arrangements of locking and non-locking tongs useful in the invention are well known and can include, but are not limited to, tong arms that can move relative to each other but do not have a locking mechanism, scissor-type arrangements of tong arms that include a hinge pin located in a more central location, tong arms that are manufactured as one piece and do not include a locking mechanism, and the like. Although tongs that do not have a locking mechanism are suitable for the invention, tongs with a locking mechanism are more suitable when the tongs are to be used in combination with a support container, as described below. Moreover, other design features of conventional tongs such as, but not limited to, heat insulation and/or grip improvement materials added to either one or both of the tong arms (1, 2), decorative features on the tong arms and/or their front ends, and the like, are suitable without departing from the scope of the invention. Typical conventional tongs designed for high heat use are made of stainless steel or the like. However, depending on the use of the tongs, other materials, such as plastics and the like, are envisioned.

As further illustrated in FIG. 1, the first tong arm 1 and the second tong arm 2 of the tongs 10 terminate in a first front end 7 and a second front end 8 that are opposed to each other and are designed for grasping articles such as, but not limited to, food products or the like. According to one aspect of the invention, the tongs 10 have a seating portion 9 in at least one of the first or second front ends 7, 8 (illustrated in the first front end 7), where the seating portion 9 is suitable for mounting of a basting apparatus 11. The basting apparatus 11 can be, but is not necessarily, removable from the seating portion 9. The basting apparatus 11 has a basting surface 12 and a baster seating portion 14 such as a retention arrangement 14 for engaging and mounting the basting apparatus 11 to the seating portion 9. The retention arrangement 14 can be, but is not limited to, a retention flange arrangement described further below. The seating portion 9 can be an indented or cutout portion on an exterior surface 13 of the front end 7, 8 or can be an opening through the entire thickness of the front end 7, 8 as shown. The seating portion 9 has a size and shape suitable to receive the retention arrangement 14. The retention arrangement 14 illustrated in FIG. 1, allows the use of the basting apparatus 11 to baste various items while it is firmly in place in the front end 7, 8 of the tong arm. In particular, if the tongs 10 are to be used for barbecuing or grilling foods that require basting, the arms of the tongs can be long enough to keep the user's hands away from the high temperatures of the barbecue while basting and/or turning the foods during cooking. Optionally, a portion of an outside edge of at least one of the front ends 7, 8 of the first and/or second tong arms 1, 2 can comprise a cutting edge 25 for cutting food or for cutting into a piece of food to check for "doneness." The cutting edge 25 can be, as a non-limiting example, a sharpened or serrated edge section. The cutting edge 25 can be omitted from the front end 8 of tong arm 2 and/or added to the front end 7 of tong arm 1. The cutting edge 25 can be, for example, hardened, coated, or flame sprayed with a hard material, such as tungsten or the like, in order to maintain the sharp edge for a longer period of time.

FIG. 2 illustrates a pair of tongs 10 having a basting apparatus 11 comprising a basting surface 12 extending outwardly from the front end 7 of the first tong arm 1 and mounted to the seating portion 9 of the front end by means of the retention arrangement 14 of the basting apparatus 11. The basting apparatus 11 illustrated in FIGS. 1 to 4 is a basting brush 15 having bristles 16 arising from a stem portion 17. The basting apparatus 11 can be any overall shape, for example: oval, elliptical, round or square, without limitation. The basting brush 15 and/or the bristles 16 are most suitably made of a flexible material such as, but not limited to, a flexible urethane, silicone, or the like. For example, the basting brush 15, bristles 16 and retention arrangement 14 can suitably be molded in one or more pieces (as a multi-component assembly), such as by compression molding, or the like. The illustrated retention arrangement 14 is a retention flange arrangement comprising upper and lower retention flanges 18 and 19, respectively, that encircle and extend laterally from the stem portion 17. Although the retention flanges 18, 19 can be of equal size as illustrated in FIG. 3, it is more desirable that one of them, preferably the upper retention flange 18, be slightly wider (i.e. extend laterally farther than the other flange), as illustrated in FIG. 4, to provide a more positive seating of the basting apparatus 11 in the seating portion 9 of the tongs 10. The retention flanges 18, 19 can also be, for example, a plurality of raised bumps rather than a continuous ridge, and the like without limitation.

The bristles 16 suitable for use in the basting brush 15 can be of any conventional size and shape. FIG. 5 illustrates an alternative basting apparatus 11 that makes use of a pad 20 instead of bristles 16, but still has a basting surface 12 and a retention arrangement 14 such as that illustrated in either of FIG. 3 or 4. The pad 20 can be any conventional non-bristled coating or application tool such as, for example, a porous sponge, random arrangement of fibers, soft cloth, etc. Many conventional types of basting apparatuses 11 can be used in the invention, provided they have a suitable means for permanent or removable mounting to a one of the tong arms 1, 2. In the illustrated embodiment, the suitable mounting means are the retention arrangement 14 for mounting to the seating portion 9 of the front end 7 of the first tong arm 1. In other arrangements, the basting apparatus 11 can be fastened to a tong arm front end 7, 8 with screws, clips, rivets, posts, adhesive or the like, without limitation. In such cases, the seating portion 9 can be simply a selected but unmodified area on the tong arm front end 7, 8.

In a very suitable arrangement, the basting apparatus 11 has a double-flanged stem 17 such that the lower flange 19 can be compressed and deflected enough to allow it to be passed through the seating portion 9 for removable mounting purposes. A basting apparatus 11 made of a flexible material will allow the user to mount and remove the basting apparatus 11 from the tongs 10 with relative ease.

The tongs 10 and basting apparatus 11 are suitably made of materials selected to minimize corrosion, resist cooking temperatures (e.g., 500° F. or more), be compatible with foods and be dishwasher safe. Many such materials are well known and commercially available.

FIGS. 6, 7 and 8 illustrate the tongs 10, with or without the basting brush 15 and the optional cutting edge 25 according to FIGS. 1 and 2, being used to turn a hotdog 20 that is cooking on a grate 21 suspended above a bed of hot coals 22, being used to baste a similarly suspended chicken leg 23, and being used as a knife to check whether a similarly suspended pork chop 24 is fully cooked.

Although the illustrated uses of the invention concern food items, it should be understood that the inventive tongs 10 with basting apparatus 11 can be similarly used for handling non-food items and cleaning or coating them with a variety of "spreadable basting materials". The spreadable basting material can be liquid, semi-liquid, paste-like, powdered and the like without limitation, edible or not.

FIGS. 9, 10 and 11 illustrate an arrangement of a tool 30 that is, for example, a pair of tongs like tongs 10, but modified (as detailed hereinbelow) to be suitable for removable attachment to an open container 40 (best seen in FIG. 15) that can serve as a substantially stable holding device for the tool 30, with or without an attached basting apparatus 11. Additionally referring to FIGS. 12-17, the exemplary tool/tongs 30 has a nose portion 31 of the first front end 7 of the first tong arm 1 having a size and shape suitable for removable containment of the nose portion 31 in a nose seating area 41 (best seen in FIGS. 14 and 15) that can be a depression in the material of a side of the container 40, or can be an opening through the side of the container 40. Other arrangements of the nose seating area 41 are also described below.

As shown in the figures, the front ends 7, 8 of the pair of tongs 30 have a scalloped edge and the nose portion 31 can be either one of the scallops or a forward-extended scallop. However, the scallop design is not intended to be limiting, as other designs of the front ends 7, 8 are appropriate and the nose portion 31 may or may not be an extension thereof. To provide further stability when the open container 40 is holding a pair of tongs 30, the first tong arm 1 can further have an opening 32 having a suitable size and shape for removably engaging an alignment tab 42 associated with the open container 40, also as further illustrated in FIGS. 11-13.

FIGS. 12 and 13 are further views, with and without an attached basting apparatus 11, respectively, illustrating the pair of tongs 30 supported on the open container 40. In these figures, the second tong end 8 has an optional decorative feature 43 of two metal buttons (bumps, dimples and the like) that look like "eyes" when the tongs 30 are viewed head on, as illustrated in FIG. 14. Furthermore, when a basting apparatus 11 is in place, particularly a basting brush, then the optional decorative feature 43 helps make the tongs 30 resemble a "bearded billy goat," when viewed head on as illustrated in FIG. 14A. Any type of decorative feature can be added to increase visual appeal.

FIG. 15 further illustrates an open container 40 for use as a holder of a tool (utensil) for applying a spreadable coating (basting) material that is held in the container 40. Although throughout this description the container 40 is described as providing support for a pair of tongs 10, 30, the container 40 can provide support for any type of tool or utensil 10, 30 having a nose portion 31 that can be seated in a nose seating area 41 described further below and an optional opening or slot 32 in an arm of the tool for removably engaging an optional alignment tab 42 of the container 40. In the arrangements described herein, the tool 30 can be a pair of tongs (like tongs 10), or can be a basting brush with handle (not shown), or any other suitable tool, especially a cooking utensil. For example, a pair of cooking tongs 30, even without an integral basting apparatus 11, can be advantageously supported by the inventive utensil-holding container 40 so that food residue on the tongs 30 can fall into the open container 40 when the tongs 30 are not in use.

The container 40 has an anti-tipping design that is especially suitable for stably supporting a long-armed pair of tongs 30 such as those often used for barbecuing or grilling.

The container 40 also has an ergonomic pot handle 57 design that comfortably fits in a hand, and which enables a user's wrist, hand, and arm to be positioned at a non-stressful, ergonomic angle when holding the container 40 level during use. A broadened second handle end 59 advantageously helps prevent the container 40 from slipping out of the user's hand.

The container 40 can be fabricated by any means including, but not limited to, wire forming, stamping, forging, casting, molding, and the like. Also, a resilient, soft, or insulating material such as, but not limited to, rubber, foam, felt, cork, and the like, can optionally be added to the bottom of the container 40. The pot handle 57 and the alignment tab 42 can be formed as a single piece with the pot 50 or, optionally can be attached to the pot 50 using rivets, screws, adhesive, welds, or the like, without limitation.

FIGS. 15-16 illustrate details of a simple exemplary form of the container 40 as a pot 50 having a bottom 51 and side(s) 52 extending upwards from the bottom 51; the sides 52 having an interior surface 53, an exterior surface 54 and top edge 55 defining an open pot top 56. The pot 50 further has a pot handle 57 extending outward from the exterior surface 54 of a side 52, and having a first handle end 58 mounted to the pot side 52 of the pot and a second handle end 59 having a width and length and extending at an outward and downward angle suitable for substantially optimum ergonomic handling of the pot 50.

The outward and downward extension of the second handle end 59 terminates at a ground plane 60 defined by the pot bottom 51 such that a handle extension distance from the first handle end 58 to the second handle end 59 is sufficient to provide a substantially longitudinal anti-tipping stability to the container 40 when the pot bottom 51 and the second handle end 59 are in contact with the ground plain 60 and, especially, when the container 40 supports a tool (e.g., tongs 30) that extends outward from the pot 50 above the pot handle 57. To further facilitate the substantial anti-tipping stability of the container 40, the pot bottom 51 can have a shape that has a dimension suitable to provide anti-tipping stability to the container 40 when in contact with the ground plane 60. For example, the pot bottom 51 can have a concave shape (opening downward, not shown). Further, a base ring or feet (not shown) optionally can be attached to extend outward the area of contact of the pot bottom 51 with the ground plane 60.

The second handle end 59 of the pot handle 57 terminates in a laterally broadened shape sufficient to provide a substantially lateral anti-tipping stability to the container 40 when the pot bottom 51 and the second handle end 59 are in contact with the ground plane 60 and the container supports a tool 30 that extends outward from the pot 50 above the pot handle 57. In an especially suitable arrangement, the second handle end 59 is shaped to provide a spaced-apart two-point contact 71a, 71b with the ground plane 60.

A portion of the pot side 52 proximal to the attachment point of the first handle end 58 comprises an alignment tab 42 having a size and shape suitable for removably engaging with the opening 32 in the arm of the tool (e.g., tong arm 1) described above. The alignment tab 42 can be, for example contiguous with the pot handle 57 or a single protrusion extending upward from the pot handle 57. In other examples, the alignment tab 42 can be attached to the pot side 52 or to the top edge 55 of the pot or to the pot handle 57, especially if the pot handle 57 is a single molded piece. The alignment tab 42 does not have to be laterally centered on the pot handle 57. It is only necessary that the opening 32 in the arm 1 of the tool 30 that it supports can be aligned with the alignment tab 42 when the tool 30 is engaged with the container 40 for removable holding and support. A very suitable arrangement is for the alignment tab 42 to be attached to, and extend upward from, the pot side 52 and optionally to be shaped with a downward spreading profile to facilitate engaging of the opening 32 in the tool arm 1.

The portion of a pot side 52 distal to the attachment point of the pot handle 57 suitably has a nose seating area 41 that can be a depression or an opening in the material of the pot side 52, and having a size and shape suitable for removably containing a nose portion 31 of a front end 8 of an arm 1 of a tool (e.g., pair of tongs 30) being held/supported by the container 40. In alternate arrangements, the nose seating area 41 can be, for example, a tab, post, latch or separate loop attached to, or integral with, the pot edge 55 or side 52, without limitation. Further, an optional step or ramp (not shown) can be formed and/or added around or near the nose seating area 41 to ease insertion of the nose portion 31 of the tool.

FIG. 16 is a side view of the container 40 described hereinabove with reference to FIG. 15. FIG. 17 is a top view of a tool or utensil such as a pair of tongs 30 while being supported by the open container 40. When the tool 30 is engaged with the container 40, the tool 30 is suitably positioned on top of the container 40 with its front end 7, 8 over the open area 56 of the container and the handle(s) of the tool 30 (e.g., tong arms 1, 2) are in registration with the anti-tip pot handle 57 as they extend outward over the pot handle 57 by (a) inserting the nose portion 31 of the tool into the nose seating area 41 of the container, and lowering the tool handle (e.g., arm 1) to engage the alignment tab 42 with the opening 32 in the tool handle 1. In a most suitable arrangement when a combination tool of a pair of tongs including a basting brush is used, the tongs are positioned such that the basting apparatus has the basting surface positioned over the open top of the container and excess basting material contained on the basting surface is allowed to fall into the container, where it is contained. Conveniently, the container 40 can be used as a receptacle (e.g., sauce pot) for containing basting materials (e.g., barbecue sauce), such that the basting apparatus 11 can be dipped into the pot 50 to obtain the basting material for coating items (e.g., sauce for basting food).

In general, the inventive container 40 has features that are uniquely suited to solve the problem of stabilizing a pot 50 against tipping over while supportively holding a relatively long handled tool 30 above it such that one end of the tool 30 is held above the open top 56 of the container 40, even when the container 40 is empty (i.e., at its lightest weight). Thus important aspects of the present invention(s) lie in the novel combination of container 40 and mating tool 30 features, which then enable conventional stabilizing/anti-tip engineering design rules to be applied to determine suitable dimensions, weights, and material characteristics for the inventive features.

For example, a general engineering rule for preventing tipping of a structure is to keep the structure's center of gravity laterally within the bounds of the structure's footprint on the ground plane. The pot handle 57 is an inventive feature in that it extends the footprint of the combined container 40 and tool 30 structure in a selected longitudinal direction. In combination, the container's nose seating area 41 and alignment tab 42 cooperate with the corresponding inventive features (nose 31 and opening 32 in an arm 1) of a tool (e.g., 30) intended for use with the container 40 to position the tool arm 1 above the pot handle 57 such that it extends in the same selected longitudinal direction. When provided these inventive features, it is a routine design task to determine a pot bottom 51 longitudinal dimension and a pot handle 57 extension length needed to longitudinally stabilize the combined structure with a given tool handle 1 length. Similarly, a pot bottom 51 lateral dimension, and/or a width for the laterally broadened second handle end 59 can be easily calculated for given heights and weights of the container 40 and tool 30. (It can be seen, then, why a locking mechanism is desirable (to reduce the structure height) when the supported tool is a pair of tongs.)

Thus the inventive features related to stability include, but are not limited to, one or more of: the pot handle 57 with the outward and downward extension of the second handle end 59 that terminates at the ground plane 60 defined by the pot bottom 51; the second handle end 59 of the pot handle 57 terminating in a laterally broadened shape, optionally with a spaced-apart two-point contact 71a, 71b with the ground plane 60; and the container's nose seating area 41 and alignment tab 42 with the corresponding nose 31 and opening 32 in an arm 1 of a tool (e.g., 30) intended for use with the container 40. Other inventive features have been described hereinabove as well.

This written description sets forth the best mode of carrying out the invention(s), and describes the invention so as to enable a person of ordinary skill in the art to make and use the invention, by presenting examples of the elements recited in the claims. The patentable scope of the invention is defined by the claims, and may include other examples that occur to those skilled in the art. Such other examples, which may be available either before or after the application filing date, are intended to be within the scope of the claims if they have elements that do not differ from the literal language of the claims, or if they have elements with insubstantial differences from the literal language of the claims.

I claim:
1. A pair of tongs comprising:
a first tong arm having a first front end, and a second tong arm having a second front end, wherein the first and second tong arms are hingedly connected to each other in a manner such that the first and second front ends are restricted to movement laterally inward toward each other for grasping articles and laterally outward away from each other, thereby defining a lateral direction as orthogonal to a surface of a one of the first and second front ends; and
a basting apparatus comprising a brush extending from a proximal end stem to a distal end basting surface, wherein the stem is mounted within a seating portion of the exterior surface of the one front end such that the brush is orthogonally aligned with the front end exterior surface, and extends laterally outward from the seating portion of the exterior surface to the laterally distal basting surface.

2. The pair of tongs of claim 1, wherein the articles comprise food products, and the basting apparatus is an applicator of food coatings.

3. The pair of tongs of claim 1, wherein the basting apparatus brush comprises bristles extending longitudinally from the proximal end stem to the distal end basting surface.

4. The pair of tongs of claim 1, wherein the basting apparatus comprises a pad being a brush.

5. The pair of tongs of claim 1, wherein:
the seating portion comprises an opening through the exterior surface of the one front end.

6. The pair of tongs of claim 5, wherein:
the proximal end stem comprises a retention arrangement suitable for engaging and removably mounting the basting apparatus to the seating portion of the one front ends.

7. The pair of tongs of claim 6, wherein the retention arrangement comprises a retention flange arrangement.

8. The pair of tongs of claim 7, wherein:
the retention flange arrangement comprises a top flange and a bottom flange spaced apart along the proximal end stem to engage the seating portion; and
a one of the top and bottom flanges extends to a greater width than the other one.

9. The pair of tongs of claim 1, wherein one of the first and second front ends of the first and second tong arms, respectively, comprises a portion of an outside edge of said one front end that is sharpened for use as a cutting edge.

10. The pair of tongs of claim 1, wherein one of the first and second front ends further comprises a nose portion having a size and shape suitable for removable containment of the nose portion in a nose seating area that opens inside of a side of an open-top container.

11. The pair of tongs of claim 1, wherein a one of the first and second tong arms comprises an opening for removably engaging an alignment tab that extends upward from a portion of an open-top container.

12. A pair of tongs in combination with a container, comprising:

a first tong arm having a first front end, and a second tong arm having a second front end, wherein the first and second tong arms are hingedly connected to each other in a manner such that the first and second front ends are restricted to movement laterally inward toward each other for grasping articles and laterally outward away from each other;

a basting apparatus comprising a basting surface extending laterally outward from a one of the first front end and the second front end; and wherein the container comprises a pot having a bottom and a side surrounding and extending upwards from the bottom to a top edge defining an open pot top, a nose portion of the first front end has a size and shape suitable for removable engagement of the nose portion with a nose seating area that opens inside of a side of the container;

thereby providing a means for supporting and removably holding the pair of tongs such that the first and second front ends are over the open top of the container when the nose portion of the first front end is engaged in the nose seating area of the container.

13. The pair of tongs of claim 12, wherein the articles comprise food products, and the basting apparatus is an applicator of food coatings.

14. The pair of tongs of claim 13, wherein the food coatings are placed in the container for use by the basting apparatus.

15. The pair of tongs of claim 12, further comprising:
a portion of an outside edge of the front end of one of the first and second tong arms that is adapted for using as a cutting edge.

16. The pair of tongs of claim 12, wherein the basting apparatus comprises a brush extending outward to the basting surface.

17. The pair of tongs of claim 12, wherein the basting surface comprises a pad.

18. The pair of tongs of claim 12, wherein the container further comprises an alignment tab that extends upward from the side, the pair of tongs further comprising:
an opening in the first tong arm of a suitable size and shape for removably engaging with the alignment tab of the container.

19. The pair of tongs of claim 18 wherein the container further comprises a pot handle extending longitudinally outward from the container, the pair of tongs further comprising:
long arms and the long arms extend longitudinally outward from the container along and above the pot handle when the nose portion of the front end of the first tong arm is engaged in the nose seating area of the container, and the opening in the first tong arm is engaged with the alignment tab of the container.

* * * * *